(Model.)

J. J. TEMPLES.
WEED TURNER.

No. 244,948.  Patented July 26, 1881.

Witnesses:
M. M. Lacey
A. Parker

Inventor
James J. Temples
By R.S. & A.P. Lacey Att'ys

UNITED STATES PATENT OFFICE.

JAMES J. TEMPLES, OF HOMERVILLE, GEORGIA, ASSIGNOR TO LUCIUS C. MATTOX, OF SAME PLACE.

WEED-TURNER.

SPECIFICATION forming part of Letters Patent No. 244,948, dated July 26, 1881.

Application filed April 30, 1881. (Model.)

*To all whom it may concern:*

Be it known that I, JAMES J. TEMPLES, a citizen of the United States, residing at Homerville, in the county of Clinch and State of Georgia, have invented certain new and useful Improvements in Weed-Turners for Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a weed-turner which may be set to different heights and at different relative angles to the mold-board.

It consists in an arm fastened to the plow-beam and depending therefrom and provided with a series of angular holes and a curved bar or turner, the shank of which is made angular to fit the angular openings in the depending arm and perforated to receive retaining-pins, as will be hereinafter fully set forth.

Figure 1:
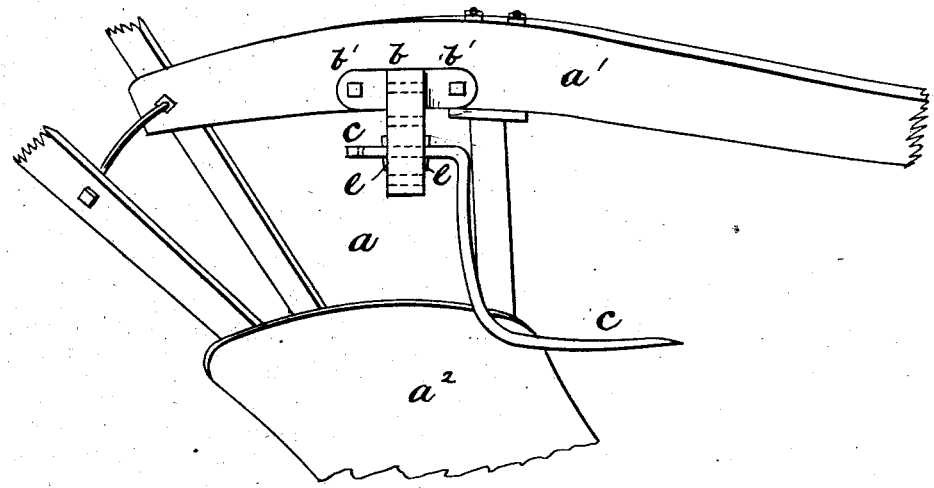
Figure 2:
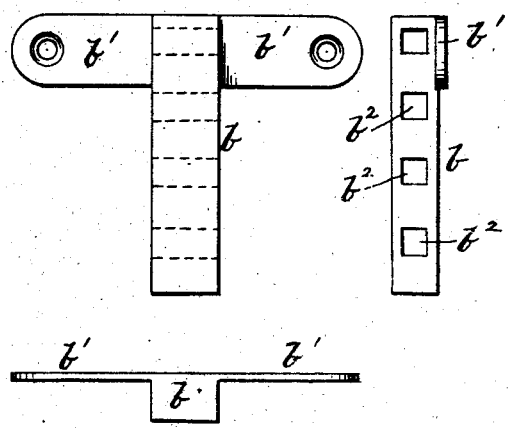
Figure 3:
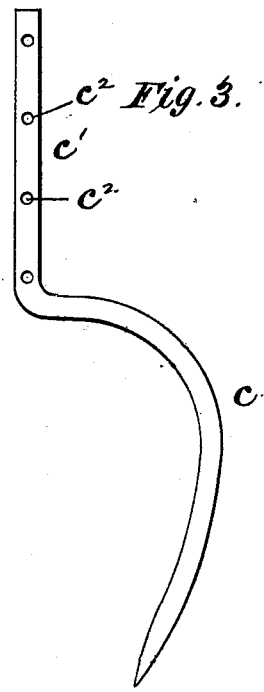

In the drawings, Figure 1 shows a plow with my weed-turner attached thereto. Fig. 2 shows detail views of the arm which holds the shank of the turner, and Fig. 3 shows the turner.

$a$ is a mold-board plow of any ordinary make.

$b$ is the arm which carries the turner $c$. The arm is provided with suitable lugs, $b'$, by which it is secured to the plow-beam $a'$. The arm depends from the beam and is provided with a series of angular holes, $b^2$. These holes are made square, as shown, by preference; but they may be made of any suitable angular shape—as, for example, hexagonal or octagonal—whereby a better or more exact degree of adjustment could be obtained for the turner. Usually the quadrangular shape is sufficient.

$c$ is the turner, made in the curved form shown, so that it will readily catch the weeds and drag them down to the edge of the furrow. It is provided with an angular shank, $c'$, made to fit into the angular holes $b^2$, and it is provided with a series of pin-holes, $c^2$, arranged at distances apart a little more than the length of the holes $b^2$, so that the retaining-pins $e\ e$, when put therein, as shown in Fig. 1, will press tight against the edges of the depending arm $b$.

The weed-turner may be set higher or lower on the arm $b$ by placing its shank in one of the upper or lower of the series of holes $b^2$, and it may be set farther forward or back by means of the holes $c^2$ in its shank and the retaining-pins $e\ e$.

Having described my invention, what I claim, and desire to secure by Letters Patent, is—

The combination, substantially as hereinbefore set forth, of an arm or support bolted to and depending vertically from the plow-beam and having a series of horizontal angular holes formed through it, one above another and parallel with the line of the plow-beam, the turner $c$, having an angular shank adapted to fit snugly into any one of the horizontal holes in the depending arm and having a series of pin-holes, $c^2$, and the retaining-pins $e\ e$, all constructed and arranged so that the turner $c$ may be adjusted vertically or forward and backward over the mold-board of the plow, substantially as set forth.

In testimony whereof I affix my signature in presence of two witnesses.

JAMES J. TEMPLES.

Witnesses:
JOSEPH P. MATTOX,
O. T. MATTOX.